(12) United States Patent
Patel et al.

(10) Patent No.: US 12,164,875 B2
(45) Date of Patent: Dec. 10, 2024

(54) SOCIAL NETWORK ADAPTED RESPONSE

(71) Applicant: KYNDRYL, INC., New York, NY (US)

(72) Inventors: Pritesh Patel, Raleigh, NC (US); Shikhar Kwatra, San Jose, CA (US); Zachary A. Silverstein, Georgetown, TX (US); Jennifer L. Szkatulski, Rochester, MI (US)

(73) Assignee: KYNDRYL, INC., New York, NY (US)

( * ) Notice: Subject to any disclaimer, the term of this patent is extended or adjusted under 35 U.S.C. 154(b) by 432 days.

(21) Appl. No.: 17/452,895

(22) Filed: Oct. 29, 2021

(65) Prior Publication Data

US 2023/0138741 A1    May 4, 2023

(51) Int. Cl.
*G06F 40/35*  (2020.01)
*G06F 40/117* (2020.01)
*G06F 40/166* (2020.01)
*G06F 40/253* (2020.01)
*G06F 40/279* (2020.01)
(Continued)

(52) U.S. Cl.
CPC ............ *G06F 40/35* (2020.01); *G06F 40/117* (2020.01); *G06F 40/166* (2020.01); *G06F 40/253* (2020.01); *G06F 40/279* (2020.01); *G10L 15/1815* (2013.01); *G10L 15/22* (2013.01); *H04L 51/52* (2022.05); *G10L 2015/228* (2013.01)

(58) Field of Classification Search
None
See application file for complete search history.

(56) References Cited

U.S. PATENT DOCUMENTS 8,150,718 B2   4/2012   Olliphant
8,671,009 B1   3/2014   Coley et al.
(Continued)

FOREIGN PATENT DOCUMENTS

CN   108960464 A   12/2018

OTHER PUBLICATIONS

IP.com, Multiple Option Exploration for Optimal Solution Recommendation via AI Voice Response System, IP.com, IPCOM000258845D, Jun. 19, 2019, 6 pgs.
(Continued)

*Primary Examiner* — Shaun Roberts
(74) *Attorney, Agent, or Firm* — Erik Swanson; Andrew M. Calderon; Calderon Safran & Wright P.C.

(57) ABSTRACT

Methods, computer program products, and systems are presented. The method computer program products, and systems can include, for instance: examining social network data of a user, wherein the social network data specifies social network connections of the user; obtaining from the user voice data defining a vocal utterance request of the user; converting the voice data defining the vocal utterance request of the user into a text based message; subjecting the text based message to natural language processing; determining a response message to the vocal utterance request of the user, wherein the determining the response data to the vocal utterance request of the user is performed in dependence on the examining of the social network data of the user; and presenting the response message to the user.

20 Claims, 11 Drawing Sheets

(51) Int. Cl.
   *G10L 15/18*   (2013.01)
   *G10L 15/22*   (2006.01)
   *H04L 51/52*   (2022.01)

(56) References Cited

U.S. PATENT DOCUMENTS

| | | | |
|---|---|---|---|
| 2015/0186156 A1 | 7/2015 | Brown et al. | |
| 2015/0188854 A1* | 7/2015 | Tomkins | G06F 16/9535 |
| | | | 709/206 |
| 2016/0005004 A1 | 1/2016 | Trabue | |
| 2016/0063381 A1* | 3/2016 | Allen | G06F 16/33 |
| | | | 706/11 |
| 2016/0366088 A1* | 12/2016 | Abou Mahmoud | H05K 999/99 |
| 2017/0235724 A1* | 8/2017 | Grewal | G06F 40/56 |
| | | | 704/9 |
| 2017/0249688 A1 | 8/2017 | Goldman | |
| 2017/0293610 A1* | 10/2017 | Tran | G06Q 10/109 |
| 2018/0012195 A1 | 1/2018 | Nagaraj | |
| 2018/0233139 A1* | 8/2018 | Finkelstein | G10L 15/1822 |
| 2018/0277108 A1* | 9/2018 | Badr | G10L 15/1822 |
| 2019/0103102 A1* | 4/2019 | Tseretopoulos | G06Q 50/01 |
| 2019/0189126 A1* | 6/2019 | Liu | G10L 15/22 |
| 2020/0026776 A1* | 1/2020 | Boss | G06T 3/4092 |
| 2020/0125632 A1* | 4/2020 | Ning | H04L 51/04 |
| 2020/0218780 A1* | 7/2020 | Mei | G06F 40/30 |
| 2020/0380991 A1* | 12/2020 | Ge | G10L 15/22 |

OTHER PUBLICATIONS

Mell, P., et al., "The NIST Definition of Cloud Computing", NIST Special Publication 800-145, Sep. 2011, Gaithersburg, MD, 7 pgs.

"AI for Customer Service", IBM, retrieved on Mar. 3, 2021 from the Internet URL: <https://www.ibm.com/watson/ai-customer-service>, 9 pgs.

Tu, C., et al., "TransNet: Translation-Based Network Representation Learning for Social Relation Extraction", retrieved on Mar. 3, 2021 from the Internet URL: http://nlp.csai.tsinghua.edu.cn/~tcc/publications/ijcai2017_transnet.pdf, 7 pgs.

* cited by examiner

SOCIAL NETWORK ADAPTED RESPONSE

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining social network data of a user, wherein the social network data specifies social network connections of the user; obtaining from the user voice data defining a vocal utterance request of the user; converting the voice data defining the vocal utterance request of the user into a text based message; subjecting the text based message to natural language processing; determining a response message to the vocal utterance request of the user, wherein the determining the response data to the vocal utterance request of the user is performed in dependence on the examining of the social network data of the user; and presenting the response message to the user.

In another aspect, a computer program product can be provided. The computer program product can include a computer readable storage medium readable by one or more processing circuit and storing instructions for execution by one or more processor for performing a method. The method can include, for example: examining social network data of a user, wherein the social network data specifies social network connections of the user; obtaining from the user voice data defining a vocal utterance request of the user; converting the voice data defining the vocal utterance request of the user into a text based message; subjecting the text based message to natural language processing; determining a response message to the vocal utterance request of the user, wherein the determining the response data to the vocal utterance request of the user is performed in dependence on the examining of the social network data of the user; and presenting the response message to the user.

In a further aspect, a system can be provided. The system can include, for example a memory. In addition, the system can include one or more processor in communication with the memory. Further, the system can include program instructions executable by the one or more processor via the memory to perform a method. The method can include, for example: examining social network data of a user, wherein the social network data specifies social network connections of the user; obtaining from the user voice data defining a vocal utterance request of the user; converting the voice data defining the vocal utterance request of the user into a text based message; subjecting the text based message to natural language processing; determining a response message to the vocal utterance request of the user, wherein the determining the response data to the vocal utterance request of the user is performed in dependence on the examining of the social network data of the user; and presenting the response message to the user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
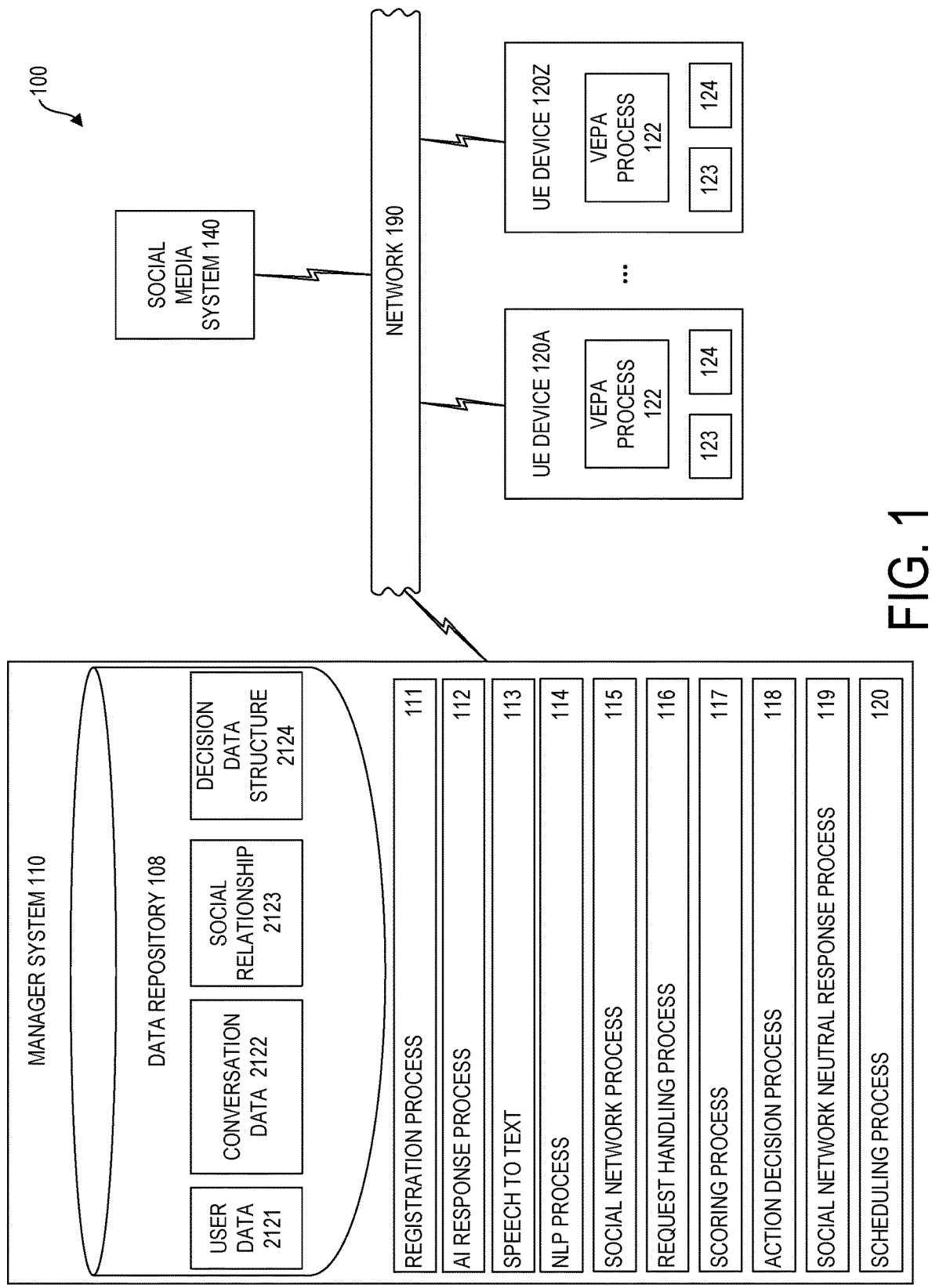
FIG. 1 depicts a system having a manager system, UE devices, and a social media device according to one embodiment.

System 100 for use in responding to user utterance requests is shown in FIG. 1. System 100 can include manager system 110 having an associated data repository 108, client computer devices, user equipment (UE) devices 120A-120Z, and social media system 140. Manager system 110, client computer devices, UE devices 120A-120Z, and social media system 140 can be in communication with one another via network 190. System 100 can include numerous devices which can be computing node-based devices connected by network 190. Network 190 can be a physical network and/or a virtual network. A physical network can include, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, manager system 110 can be external to UE devices 120A-120Z and/or social media system 140. In one embodiment, manager system can be collocated with one or more of UE devices 120A-120Z and/or social media system 140.

UE devices 120A-120Z can be associated to different users. UE devices 120A-120Z can be computer devices used by users of system 100, such as users who use system 100 to obtain responses to messages in the form of conversation data user utterance request data messages. UE devices 120A-12Z can be provided, e.g., by smartphones, laptops, smartwatches, dedicated personal assistants in dedicated personal assistant form factors, and/or personal computers (PCs).

Respective ones of UE devices 120A-120Z can run voice enabled personal assistant process (VEPA process) 122, which can configure the UE device as a personal assistant irrespective of its form factor. VEPA process 122 can run one or more voice activated process. Voice activated processes can be developed, e.g., for control of home appliances, home climate control, home video equipment, voice activation of purchase transactions, voice activated music listening services, and data lookup and research services. VEPA process 122 can include audio input device 123, e.g., a microphone, for pickup of conversation data and one or more audio output device 124, e.g., a speaker. VEPA process 122 can also run a data formatting process to format audio input data into data packets for transmission to manager system 110 which can support operations of VEPA process 122. VEPA process 122 can include technologies having characteristics exhibited by, e.g., by an ALEXA® personal assistant (ALEXA® is a Registered Trademark of Amazon.com, Inc. of Seattle, WA). In one embodiment, VEPA process 122 can be provided by a HOMEPOD® intelligent personal assistant available from Apple, Inc. (HOMEPOD® is a Registered Trademark of Apple, Inc. of Cupertino, CA). In one embodiment, VEPA process 122 can be provided by an Apple iPhone® having SIRI® voice services (iPhone® and SIRI® are Registered Trademarks of Apple, Inc. of Cupertino, CA). VEPA process 122 can configure respective UE devices of UE devices 120A-120Z as a digital assistant.

Conversation data herein can include voice based data picked up by audio input device 123 when a user in pickup range of a UE device running VEPA process 122 is interacting with and in conversation with VEPA process 122. Conversation data herein can include voice based data picked up by audio input device 123 when a user in pickup range of a UE device running VEPA process 122 is interacting with and in conversation with another user. Conversation data herein can include text data converted from voice based data that defines conversation data. Conversation data herein can include text data as originally input by a user without conversion from voice based input. Conversation data can be sent by VEPA process 122 for receipt by manager system 110 e.g., by AI response process 112.

Embodiments herein recognize that existing approaches for responding to user utterance requests can be limited and do not always accurately return information optimized based on the user's prior experiences. Embodiments herein set forth to derive insights into preferences of users and based on those using social network data of a user and based on those insights improving virtual assistant (VA) communications to a user. Embodiments herein recognize that historical communications of a user with other users in a user's social network can be useful in ascertaining user preferences. Embodiments herein recognize that historical actions of users in a user's social network can be useful in ascertaining user preferences. Embodiments herein can include various features that utilize historical communications and other interactions with other users in a user's social network, as well as actions of users in a user's social network for return of improved VA assistant data to a user.

Manager system 110 can include data repository 108 that stores various data. In user data area 2121, data repository 108 can store data on users of system 100. User data can include such data as, e.g., registration status, contact information, permissions, and the like. In conversation data area 2122, data repository 108 can store conversation data of users. The conversation data can include historical conversation data of users. The conversation data can include pre-tagged data that specifies natural language processing (NLP) tags for various conversation data. The NLP tags can include, e.g., part of speech tags, topic tags, and sentiment tags as well as user identifier tags and timestamped tags.

Data repository 108 in social relationship area 2123 can include relationship graph data for each respective registered user of system 100. The relationship graph data can include nodes and edges that specify social relationships of each respective user of system 100. The nodes can represent human users (people) and the edges can represent social connections between different human users.

Data repository 108 in decision data structure area 2124 can include decision data structures for use in return of action decisions by manager system 110. The decision data structures can include, e.g., decision tables and/or decision trees.

Manager system 110 can run various processes. Manager system 110 running registration process 111 can include manager system 110 receiving and processing registration data of a user. In response to receipt of registration data of a user, manager system 110 can register a new user as a registered user of system 100. On the registration of a user, manager system 110 can provide user data for the user in conversation data area 2121 and social relationship area 2123.

In response to registration request, manager system 110 can establish a new user as a registered user of system 100 and can assign the user a universally unique identifier (UUID). Under the UUID, manager system 110 can query one or more social media system 140 for user data, e.g., historical conversation data of a user, and can subject the received conversation data to natural language processing in order to pre-tag historical conversation content of each user.

Manager system 110 running artificial intelligence (AI) response process 112 can adapt manager system 110 to respond to user utterance request data messages such as user voice-based or user text-based utterances. AI response process 112 can perform various functions, e.g., can recognize a particular user's voice, e.g., a user of VEPA process 122, and based on the recognizing can access resources for predicting behavior of the user. For performing such functions, AI response process 112 can store a corpus of conversation data of the user being responded to. Stored conversation data can be, e.g., voice based and/or text based. AI response process 112 can run a conversation logging process, wherein conversation data is stored into conversation data area 2121 for later use by AI response process. VEPA process 122 can be interacted with using voice commands by a mobile device user. These interactions can be single utterance ("what is the weather today?"), or conversational involving back-and-forth between the user and the digital assistant ("what's on my calendar today?", "OK reschedule my 10 am meeting").

Embodiments herein can enhance the functionality of AI response process 112 with use of additional processes, such as processes 113 through 120 herein.

Manager system 110 running speech-to-text process 113 can process any voice-based data received from a user and convert the voice-based data into text-based data. In one embodiment, speech to text process 113 can be Hidden Markov Model (HMM) based. In one embodiment, an HMM model for a sequence of phonemes can be provided by concatenating individually trained HMMs for individual phonemes.

Manager system 110 running NLP process 114 can run various natural language processing processes for return of NLP tags associated to user defined utterance request data which may be user utterance request data converted into text-based format. Natural language processing performed by NLP process 114 can include, e.g., part of speech processing, topic extraction, natural language processing, and sentiment processing. Natural language processing performed by NLP process 114 can also include, e.g., word-to-vector processing. With word-to-vector processing, a corpus of text-based messages can be subject to machine learning processes so that the plurality words defining a dictionary can be expressed as numerical vectors. Manager system 110 performing word-to-vector natural language processing can include manager system 110 training a word-to-vector predictive model, with training data that comprises historical messages by system users. A word-to-vector predictive model once trained can respond to query data, e.g., for return of a similarity score that specifies the similarity to a first word or phrase to a second word or phrase. Manager system 110 can utilize a word-to-vector predictive model for return of return data that specifies similarities between historical messages and or users of system 100.

Manager system 110 can run NLP process 114 to process data for preparation of records that are stored in data repository 108. Manager system 110 can run a natural language processing (NLP) process 114 for determining one or more NLP output parameter of a message which can be expressed as message tags. Tags can include, e.g., part of speech tags, topic tags, and sentiment tags.

NLP process 114 can include one or more of a topic classification process that determines topics of messages and output one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness" or other classification process for output of one or more other NLP output parameters e.g., one of more "social tendency" NLP output parameter or one or more "writing style" NLP output parameter.

By running of NLP process 114 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." Manager system 110 running NLP process 114 can include manager system 110 returning NLP output parameters in addition to those specifying topic and sentiment, e.g., can provide sentence segmentation tags, and part of speech tags. Manager system 110 can use sentence segmentation parameters to determine, e.g., that an action topic and an entity topic are referenced in a common sentence for example. Manager system 110 applying NLP tags can also include manager system applying natural language understanding processing and applying natural language understanding derived tags. For example, while part of speech tags can be used to provide intent and entity tags, intent and entity derivation can be supplemented or replaced with use of intent and entity predictive model, which has been trained with training data instances which include message data in combination with administrator user defined intent and entity tags for the message data.

Manager system 110 running social network process 115 can provide relationship graph data specifying a current social network of respective users of manager system 110 and system 100. Manager system 110 providing a social relationship graph for a user can include manager system 110 providing a social relationship graph that specifies a user's relationship to other users. Manager system 110 running social network process 115 can include manager system examining social media data of a certain user to identify social connection of a user in the building of a relationship graph. For building a relationship graph for a certain user, manager system 110 can identify first order connections of a certain user which can refer to persons to whom the certain user has connected directly, as well as second order connections, third order connections and Nth order connections. Second order connections can be persons whom with the first order connections have connected directly, and third order connections can be persons whom with the second order connections have connected with directly. Embodiments herein recognize that in social networks, relations between vertices can be dynamic and complex. Embodiments herein can represent the social relations by extracting key phrases from the interactive text information as a relation label set. Embodiments herein recognize that key phrases can be flexible and capable of capturing complex semantic information within social relations. In one embodiment, social relation extraction (SRE) can be used to extract relations between social network vertices, and to predict social relations for social networks. According to one embodiment, SRE can be used to provide multiple labels to edges in a social relationship graph. In one aspect, a translation based network representation learning model (NRL)

can be used to provide a relationship graph, in which key phrases with use of SRE are examined in order to dynamically provision edges of a relationship graph with multiple labels.

Manager system 110 running request handling process 116 can include manager system 110 processing received utterance request data of a user for responding to received utterance request data received from a user. For handling received user utterance request data, manager system 110 can subject received user utterance request data to natural language processing to identify entities and intents within received utterance request data. In the receipt and processing of utterance request data, manager system 110 can transform question-based utterance request data into declarative form in order to augment comparison to corpus-based conversation data message data stored within conversation data area 2122 of data repository 108. In the handling of received utterance request data, manager system 110 running request handling process 116 can compare received utterance request data to historical messages including declarative statement utterance data of other users in order to identify within the historical utterance data message data of other users' candidate responses to received utterance data. Historical messages of other users stored in conversation data area 2122 can include, e.g., messages derived from use by other users of their respective UE devices 120A-120Z running instances of VEPA process 122 as well as, e.g., message data from user posts in social media system 140.

In order to identify candidate responses, manager system 110 running request handling process 116 can query a word-to-vector predictive model in order to discover a similarity of an incoming utterance request data message to historical conversation data messages of other users stored in conversation data area 2122 of data repository 108. Manager system 110 running request handling process 116 can include manager system 110 identifying historical declarative utterance messages by prior users that match an intent and entity of the current incoming user-defined utterance request data message being subject to processing. For performing such matching, manager system 110 can identify prior historical utterance data messages having a threshold level of similarity in terms of intent and entity with respect to a current message. For identifying matching messages having a threshold level of similarity, manager system 110 can query word-to-vector predictive model in order to identify similarity level between entities of a current incoming utterance request data message to historical messages and an intent of a current utterance request data message to historical utterance messages.

With candidate responses identified, manager system 110 can run scoring process 117 in order to score the various candidate responses. Manager system 110 running scoring process 117 can include manager system scoring the various candidate responses identified from historical user data of user data area 2121 identified by request handling process 116. Manager system 110 running scoring process 117 can apply a multifactor formula that includes various factors. Manager system 110 running action decision process 118 to return an action decision, e.g., for presentment of a response message. In one embodiment, the action decision can be dependent on a result of a scoring process.

Manager system 110 running social network neutral response process 119 can make available one or more response assistant for responding to the utterance request data messages of users that is social network neutral. While adapting a response in view of a social network can provide advantages, various functions herein can make use of a response assistant that is social network neutral. In one example, a plurality of social network neutral response assistants can be queried for return of a plurality of candidate responses, and social network insights can be used to select for presentment to a user one of the candidate responses. In another example, query of the social network neutral response assistant can be used to check a relevance of a candidate response message generated by processing social network data. In another example, a social network processing can be used to transform an input request utterance data message of a user and the transformed user utterance request data message can be presented to the social network neutral response assistant for return of a response for presentment to a user. Such a social network neutral response assistant can be provided by a commercial off the shelf (COTS) response assistant. In one example, the one or more COTS response assistant can be or have characteristics of a commercially available digital assistant, e.g., ALEXA® personal assistant (ALEXA® is a Registered Trademark of Amazon.com, Inc. of Seattle, WA), HOMEPOD® intelligent personal assistant available from Apple, Inc. (HOMEPOD® is a Registered Trademark of Apple, Inc. of Cupertino, CA), or Apple iPhone® having SIRI® voice services (iPhone® and SIRI® are Registered Trademarks of Apple, Inc. of Cupertino, CA).

Manager system 110 running scheduling process 120 can schedule and book appointments for a user in dependence on generated response data presented to a user. As set forth herein, manager system 110 can generate response message data to a user in response to processing of an utterance request data message received from a user. In another aspect, manager system 110 in presenting response message data can schedule and book an appointment at an entity location of an entity that is referenced in response message data presented to a user. In one aspect, manager system 110 can identify an entity, e.g., business location that is referenced in response message data. Manager system 110 can then perform web-based searching for process portals that facilitate process based scheduling with such entities. Manager system 110 can send appropriate schedule booking commands through a selected process portal associated to an entity referenced in response data and on receipt of booking confirmation from the entity process portal can responsively update a calendar of the user sending utterance request data within information of the scheduled and booked appointment.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 140. On being registered, manager system 110 can examine data of social media system 140, e.g., to determine whether first and second users are in communication with one another via a messaging system of social media system 140. A user can enter registration data using a user interface displayed on a client computer device of UE devices 120A-120Z. Entered registration data can include e.g., name, address, social media account information, other contact information, biographical information, background information, preferences information, and/or permissions data e.g., can include permissions data allowing manager system 110 to query data of a social media account of a user provided by social media system 140 including messaging system data and any other data of the user. When a user opts-in to register into system 100 and grants system 100 permission to access data of social media system 140, system 100 can inform the user as to what data is collected and why, that any collected personal data may be encrypted, that the user can opt out at any time, and that if the user opts out, any personal data of the user is deleted.

A method for performance by manager system 110 interoperating with UE devices 120A-120Z and social media system 140 is described with reference to the flowchart of FIG. 2. At block 1201, UE devices 120A-120Z can be sending registration data that specifies registration requests to manager system 110. Users can define registration data with use of user interface 3000 as shown in FIG. 3 which can be a displayed user interface for display on a display of a UE device of the user. User interface 3000 can include, e.g., registration data area 3002, configuration area 3004 to permit user configuration of system 100, and display area 3006 configured for display of result data. In registration data area 3002 a user can specify, e.g., contact data, and permissions. Permissions can include permissions to permit manager system 110 to store an use conversation data of users. Conversation data can include conversation data received through VEPA process 122 of a user's UE device, and/or conversation data (normally text based) posted on a user's account within social media system 140.

In response to the receipt of the registration data, manager system 110 can validate the registration data and responsibly send an installation package at block 1101 to UE devices for installation thereon. In response to the received installation packages, UE devices 120A-120Z can install the installation packages sent at block 1101 at block 1202. The installation packages sent at block 1101 can include, e.g., binaries, libraries, and executable code which when installed at block 1202 configure UE devices 120A-120Z to be operational within system 100. The installed installation package can define functionalities that facilitate participation of UE devices 120A-120Z within system 100.

Further in response to the received registration data, manager system 110 at block 1102 can send query data to social media system 140. The query data sent at block 1102 can include query data to obtain social network return data from social media system 140. The query data sent at block 1102 can include query data to obtain information specifying a social network of the newly registered user associated to the request data sent at block 1201, as well as historical message data of users associated with the newly registering user. The social network data can include data specifying the social network connections of the newly registering user and data including, e.g., first-order connections, second-order connections, and so on. In response to receipt of the query data, social media system 140 at block 1401 can send response data. The response data can include response data identifying individuals within a social network of a newly registering user as well as historical communication conversation data messages of those users.

In response to the receiving response data sent at block 1401, manager system 110 at block 1103 can send to its associated data repository 108 for storage at block 1081 the registration data defined by the request data sent at block 1201, as well as historical messages of the newly registered user information on individuals included within a social network of the newly registering user stored within social relationship area 2122 and conversation data messages associated to such individuals for storage within user data area 2121.

Figure 2:
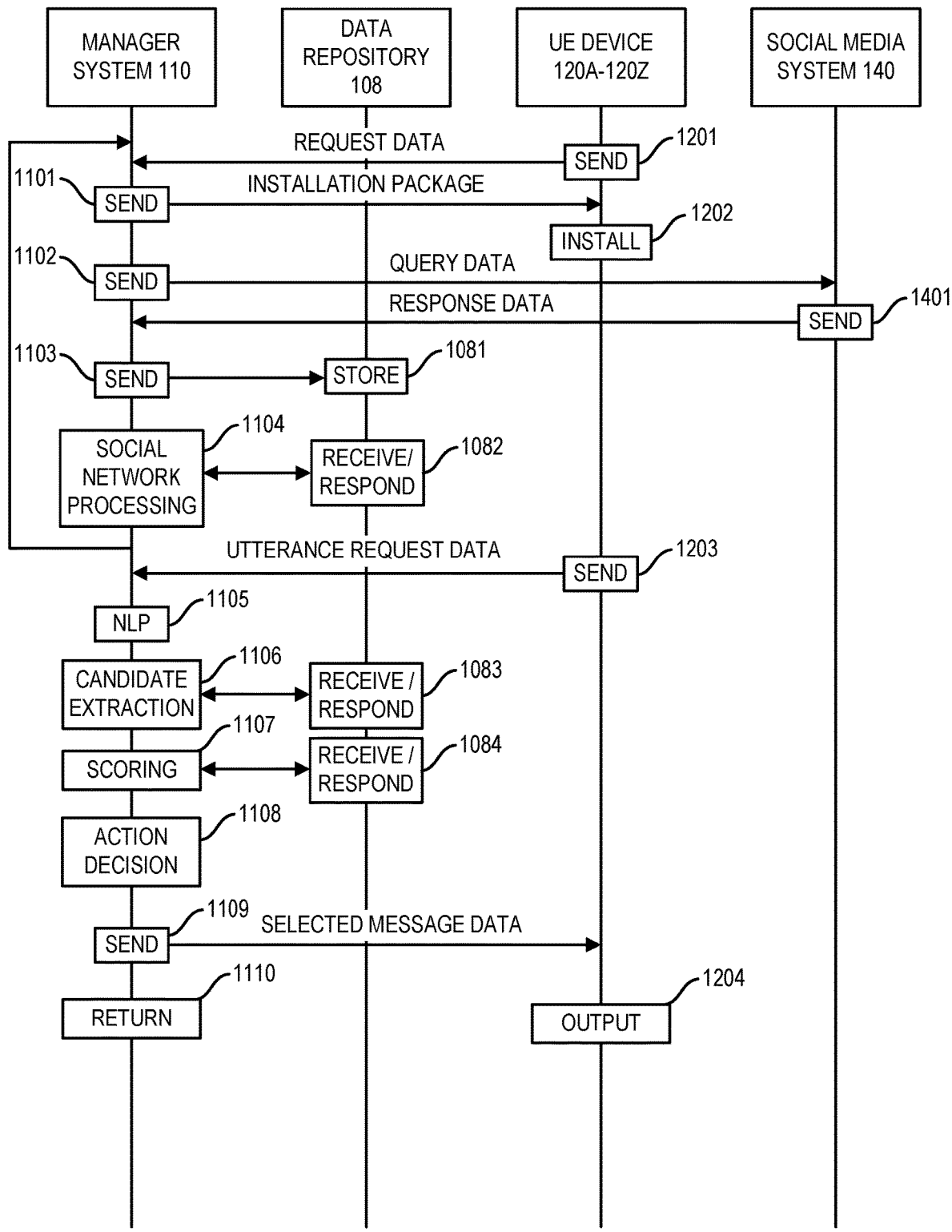
FIG. 2 is a flowchart illustrating a method for performance by a manager system interoperating with UE devices and a social media system according to one embodiment.
Figure 3:
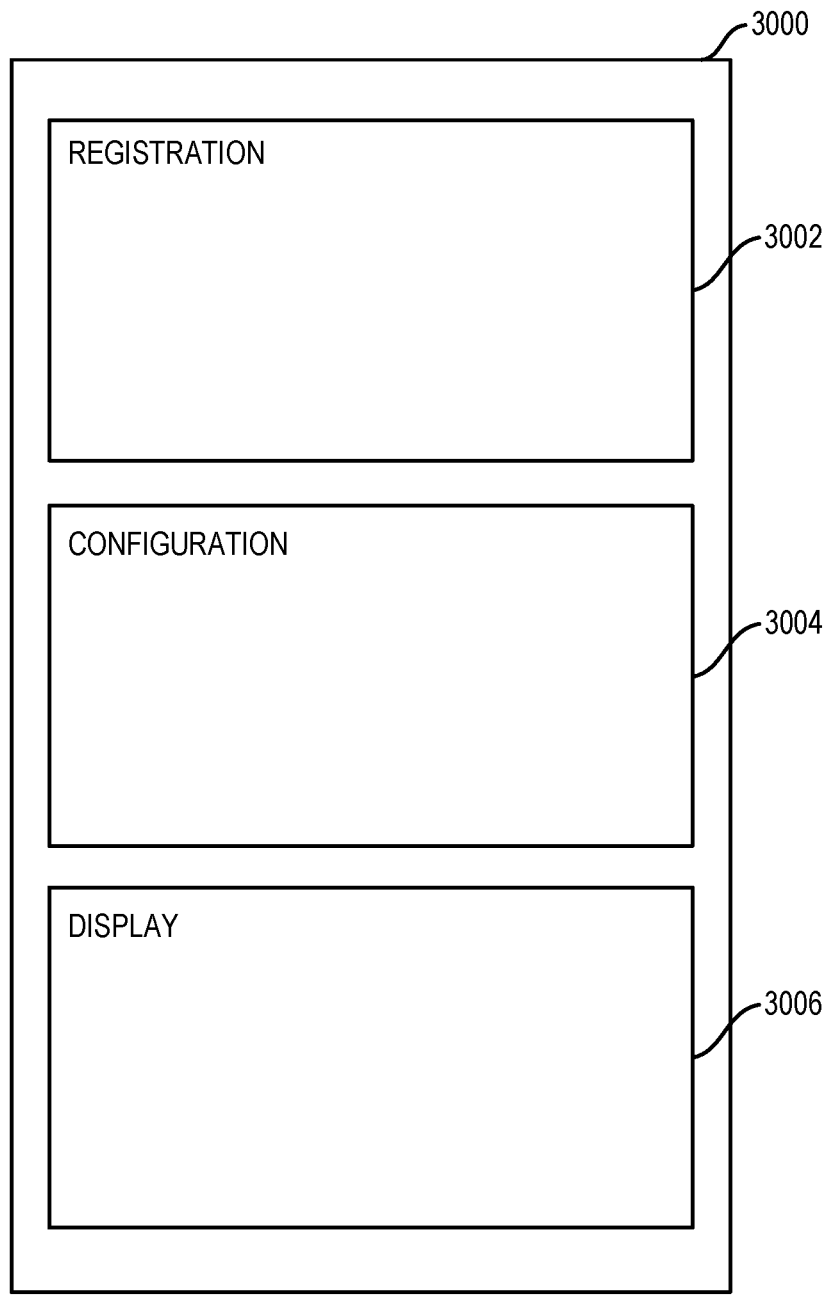
FIG. 3 depict a displayed user interface according to one embodiment.

As indicated by the flowchart of FIG. 2, manager system 110 can iteratively perform the loop of blocks 1101-1104 during a deployment of time of manager system 110. The corpus of conversation data of all users can iteratively grow not only by the iterative query of social media system 140, but by the iterative uploading of conversation data into conversation data into conversation data area 2122 through the iterative use by respective users of their respective UE device configured as digital assistants by the described respective instances of VEPA process 122. In another aspect, the conversation data messages stored in conversation data area 2122 can be contemporaneously with storage be subject to natural language processing by NLP process 114 so that conversation data messages can be tagged with pre-tagged NLP tags, including e.g., part of speech, topic and sentiment.

In response to completion of send block 1103, manager system 110 at block 1104 can perform social network processing. Manager system 110 can run social network process 115 to return a relationship graph specifying attributes of a social network of the current registered user as well as all registered users of system 100. Manager system 110 performing block 1104 can include manager system 110 running social network process 115.

Figure 4:
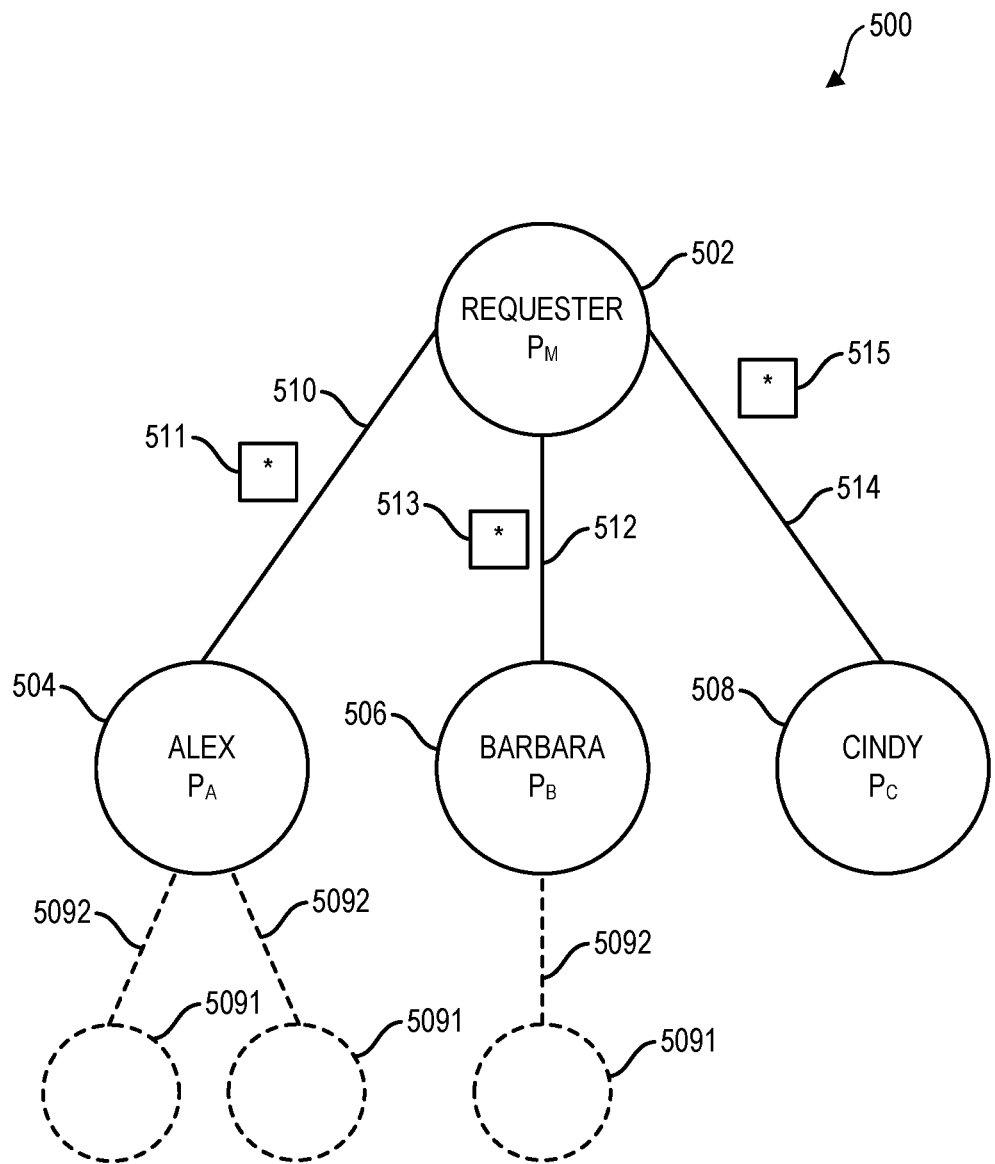
FIG. 4 depicts a relationship graph according to one embodiment.

A representation of a social network relationship graph is shown in FIG. 4. A social network relationship graph 500 can include node 502 specifying a certain user such as the user sending the utterance request data message at block 1203, as well as nodes 504, 506, 508, 5091 specifying users who are socially connected to the certain user. Edges can specify relationships between the different users. Connections of users can include primary connections of a user, i.e., users who are located one edge from the certain user, as well as second-order connections, i.e., individuals who are connected via first and second edges via two edges from the user. That is, with reference to FIG. 4, the user associated to node 504 is a first-order connection user of the certain user associated to node 502, and the users associated to nodes 5091 are second-order users of the certain user associated to node 502.

Subsequent to completion of block 1104, manager system 110, as indicated by the return arrow, can iteratively receive new registration data sent from the same or another UE device(s) at block 1201 and can iteratively perform the loop of blocks 1101 to 1104 during a deployment of manager system 110. Manager system 110 at blocks 1103 and 1104 can iteratively update for all users of system 100 referenced in user data area 2121 and conversation data area 2122 within data repository 108 and can iteratively update social relationship data of all users of system 100 by updating of social relationship data area 2123 of data repository 108 as shown in FIG. 1.

In the sending of response data at block 1103 for storage into data repository 108, manager system 110 can be subjecting to natural language processing historical message data of all users for which such historical message data is received. Thus, historical message data stored in data repository 108 for all users can include pre-tagged natural language processing tags indicating, e.g., part of speech, and part of speech tagging an extracted noun can specify an extracted entity, and an extracted verb can identify an extracted intent. Extract data tags stored in user data area 2121 can also include extracted topics which can map to extracted entities which can include extracted entities as well as extracted sentiments.

Contemporaneously with manager system 110 iteratively performing the loop of block 1101-1104, manager system 110 can proceed to block 1105-1110 to process incoming utterance request data messages of users using UE devices 120A-120Z where such users are registered users of system 100. An utterance request data message of a user can be a voice based utterance query processed by a respective VEPA process 122 of a user's respective UE device of UE devices 120A-120Z. An utterance request data message of a user can also be a text based utterance originating from a text base entry by a user without transformation of voice into text.

At block 1203, a UE device, e.g., UE device 120A can send user-defined utterance request data for receipt by manager system 110. The utterance request data can be voice-based utterance data, text-based utterance data, user-defined text-based utterance data, or text-based data converted from voice. System 100 can convert voice into text at UE device or by manager system 110. In response to the received utterance request data sent at block 1203, manager system 110 at NLP block 1105 can run NLP process 114 to subject the received utterance request data to NLP processing (natural language processing) to extract and apply NLP data tags to the received utterance request data sent at block 1203. The utterance request data, according to one example, can define an utterance request data message defined by a user. Examples of utterance request data messages herein can be "Please recommend the best Mexican restaurant," "Please recommend the closest place to get a haircut," "What is the best place to buy shoes?", and so forth.

Manager system 110 performing NLP block 1105 can include subjecting the received utterance request data message to natural language processing in order to apply part of speech tags to the received utterance request data message. The part of speech tags can include part of speech tags that identify nouns and verbs as part of speech of the received utterance request data. In one aspect, the identified nouns can specify entities and the identified verbs can specify intents. Prior to subjecting received utterance request data to natural language processing, manager system 110 can transform the utterance request data from question form and statement form to augment results derived by comparison with corpus data of conversation data of conversation data area 2122. Manager system 110 applying NLP tags at block 1105 can also include manager system 110 applying topic tags and sentiment tags to a received utterance data conversation data message.

Figure 5:
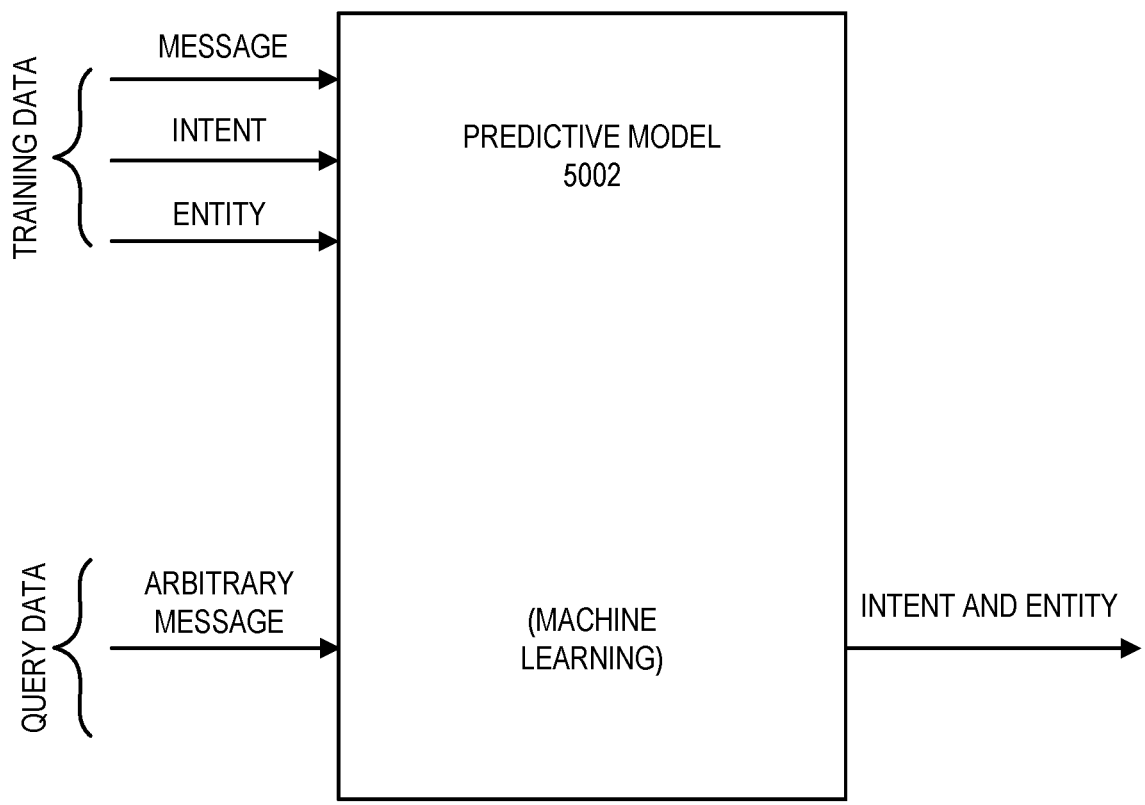
FIG. 5 depicts a machine learning model for predicting intent and entity within an arbitrary message according to one embodiment.

Manager system 110 applying NLP tags at block 1105 can also include manager system 110 applying natural language understanding derived tags. For example, while part of speech tags can be used to provide intent and entity tags, intent and entity derivation can be supplemented or replaced with use of intent and entity predictive model 5002 as set forth in FIG. 5. With reference to FIG. 5 there is shown a predictive model 5002 trained to predict entity and intent of any arbitrary conversation data message. Predictive model 5002 can be trained with iterative instances of training data. Each instance of training data can include the combination of (a) an historical conversation data message and (b) administrator user defined intent and entity tags associated to the conversation data message. Trained as described, predictive models 5002 learns of a variety of different ways an intent and an entity might be expressed. Training data for learning the intent "#purchase" might comprise the set of training data messages "I want to purchase . . . ", "I'd like to buy . . . ", "where do I buy . . . ", "I just got", "I purchased . . . " with the administrator user associating the intent "#purchase" to each training data message. Once trained, predictive model 5002 is able to respond to query data. The query data can take the form of an arbitrary message. In response to the input of query data, predictive model 5002 can output response data. The response data can be a predicted intent and entity associated to the input query data.

On completion of block 1105, manager system 110 can proceed to candidate extraction block 1106. At candidate extraction block 1106, manager system 110 can run request handling process 116 to identify candidate responses to the utterance request data sent at block 1203 where the utterance request data sent at block 1203 defines an utterance request data message.

For identifying candidate user responses to the user specified request query data sent at block 1203, manager system 110 at block 1106 can identify within user data area historical utterance messages of selected users referenced in data repository 108 having entities and intents matching the utterance request data sent at block 1203 subject to NLP processing at block 1105. In one embodiment, manager system 110 can identify the selected users in dependence on social connections of the user as determined by performance of block 1104. In one example, the selected users can be restricted to first order connection of the user. In one example, the selected users can be restricted to first order and second order connections of the user. In one example, the selected users can be restricted to first order connection of the user. In one example, the selected users can be restricted to first order to Nth order connections of the user, where the value N can be dynamically determined.

Figure 6:
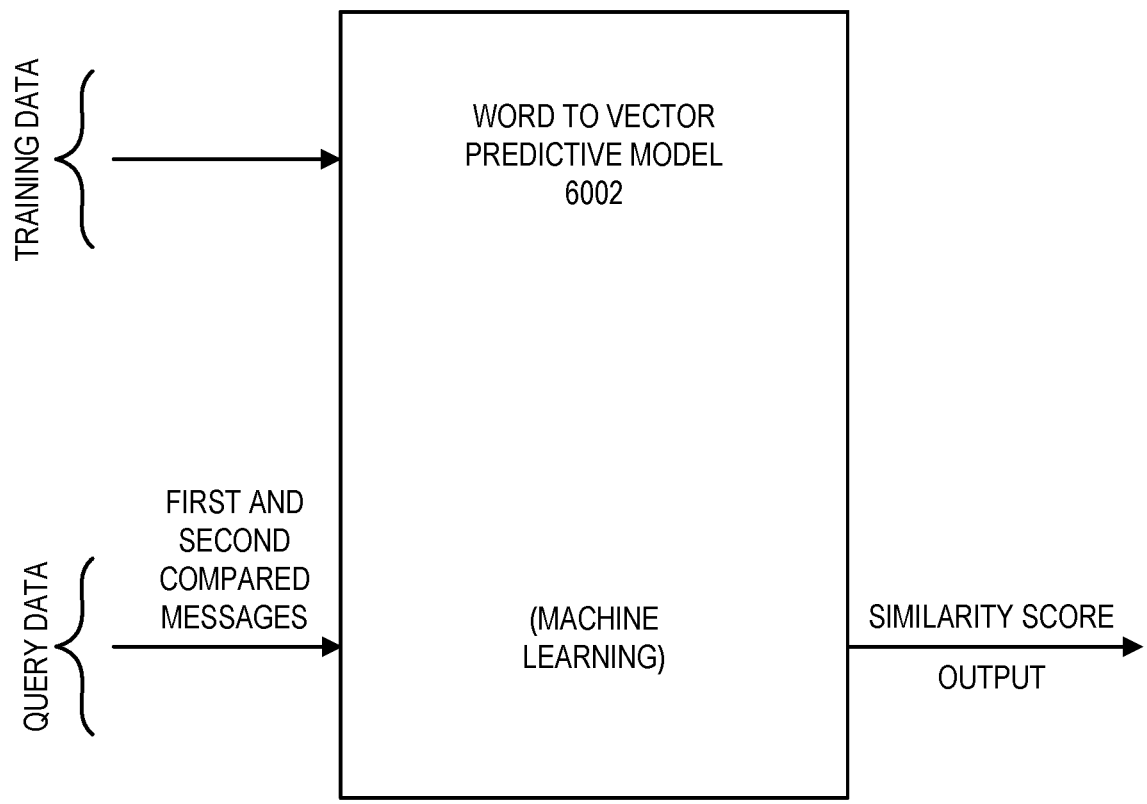
FIG. 6 depicts a machine learning word to vector predictive model according to one embodiment.

For extracting candidate message responses at block 1106, manager system 110 can compare extracted entity and intent extracted from the incoming utterance request data sent at block 1203 to previously extracted entity and intent extracted from respective ones of historical utterance messages stored in user data area 2121. For facilitating comparison between an extracted entity and intent associated to a current incoming utterance request data message and an extracted entity and intent associated to an historical message, manager system 110 can query word-to-vector predictive model 6002 as set forth in FIG. 6 which can be configured by training data using a training corpus to respond to query data which includes a first entity and intent associated to an incoming message and a second entity and intent associated to an historical utterance message being subject to evaluation.

Manager system 110 can use predictive model 6002 to compare an incoming utterance request data message to historical conversation data messages of other users stored in conversation data area 2122 of data repository 108. Predictive model 6002 can return data specifying accumulative Euclidian distance for the compared entities and intents subject to comparison. Manager system 110 can include amongst a set of returned candidate response utterance messages returned at block 1106 evaluated historical utterance messages of conversation data area 2122 based on the evaluated historical utterance message having a similarity with the incoming utterance request data message exceeding a similarity threshold.

In one embodiment, manager system 110 at block 1106 and extracting a candidate historical message as a candidate response can preliminarily include the response as a candidate response based on the Euclidean distance processing described using the word-to-vector processing word to vector predictive model 6002, and then can confirm the inclusion by using word-to-vector predictive model 6002 again with the inputs being the raw incoming utterance request data message sent at block 1203 and the underlying historical message, i.e., without reference to extracted entities or intents.

With candidate responses extracted at block 1106, manager system 110 can proceed to block 1107. At block 1107, manager system 110 can score the candidate responses extracted at block 1106. Manager system 110 can score the various candidate responses using Eq. 1 as set forth below.

$$S=F1W1+F2W2+F3W3+F4W4+F5W5+F6W6 \quad \text{(Eq. 1)}$$

Where S is the cumulative score for the candidate response, F1-F6 are factors, and W1-W6 are weights associated to the various factors. According to one embodiment, F1 can be a social relationship factor, F2 can be a message similarity factor, F3 can be a popularity factor, F4 can be in expertness factor, F5 can be a relevance factor and F6 can be sentiment factor. Form the receive and respond block 1082, 1083, and 1084 of the flowchart of FIG. 2, it can be seen that a variety of process by manager system 110 can involve iterative queries of data stored in data repository 108.

According to factor F1, manager system 110 can assign scoring values under factor F1 in dependence on a strength of a social connection between a current user and a user associated to a candidate response. For example, referring to FIG. 4, there is shown a relationship graph which can be built and updated at block 1104. For example, with reference to the relationship graph of FIG. 4, manager system 110 applying factor F1 can apply a higher than baseline scoring value under factor F1 in the case that the user associated to the candidate utterance message being evaluated is a first-order connection, can apply a baseline scoring value in the case that the user associated to the candidate utterance message being evaluated is a second-order connection, and can apply a lower than baseline scoring value under factor F1 in the case that the user associated to the message being evaluated is a third or lower order connection. Manager system 110 according to factor F1 can apply additional scoring values in the case that an edge of a relationship graph has multiple labels. For example, referring to FIG. 4, as indicated by elements 511, 513, and 515 relationship graph 500 can include dynamically updated multi-label edges determined through SRE and translation network analysis as set forth herein. Relationship graph 500 can also include dynamically updated node values as indicated by the node values $P_M$, $P_A$, $P_B$, and $P_C$. Edges such as edges 510, 512, 5114, and 592 can specify social connections between users represented by nodes of relationship graph 500.

Manager system 110 applying scoring values under factor F2 can assign scoring values under factor F2 in dependence on message similarity between historical messages of the current user and the user associated to the candidate utterance message in response to being evaluated. For performance of scoring under factor F2, manager system 110 can identify the specific user of the candidate message being evaluated, and retrieve all messages of the specific user. Manager system can then compare all historical messages of the current user sending the utterance request data at block 1203 to all messages of the specific user.

Manager system 110 under factor F2 can apply K-means clustering analysis. For each K-means clustering analysis manager system 110 can compare historical messages associated to different users, wherein the historical messages are represented as data points in two dimensional space. K-means processing is described with reference to FIG. 7. In one use case, the X axis for the K-means clustering can represent sentiment and the Y axis can represent word complexity. In another example, the X axis can represent word complexity and the Y axis can represent word count. In another example, the X axis can represent sentiment and the Y axis can represent word count, and so on. Manager system 110 can aggregate the results of multiple K-means clustering analyses in which first and second parameters are evaluated. In one embodiment, the historical messages of the user and the user associated to the candidate response message utterance can include all messages of the two users. In another example, the messages of the current user and the user associated to the candidate response utterance message being evaluated can include a reduced set of messages between the users, wherein message filtering to reduce the count of messages evaluated can be performed using extracted domain, extracted from the user's incoming utterance request data sent at block 1203. For example, if the topic domain of the incoming message defined by the utterance request data sent at block 1203 relates to a certain topic domain, the messages subject to K-means clustering analysis as described in reference to FIG. 7 can be filtered and limited to those messages between the users associated to the certain topic domain, e.g., restaurants, personal services, professional services, and the like. Thus, as part of launching a K means clustering analysis, manager system 110 can ascertain a topic domain of an incoming message and filter the messages subject to comparison to those historical messages matching the topic domain.

Figure 7:
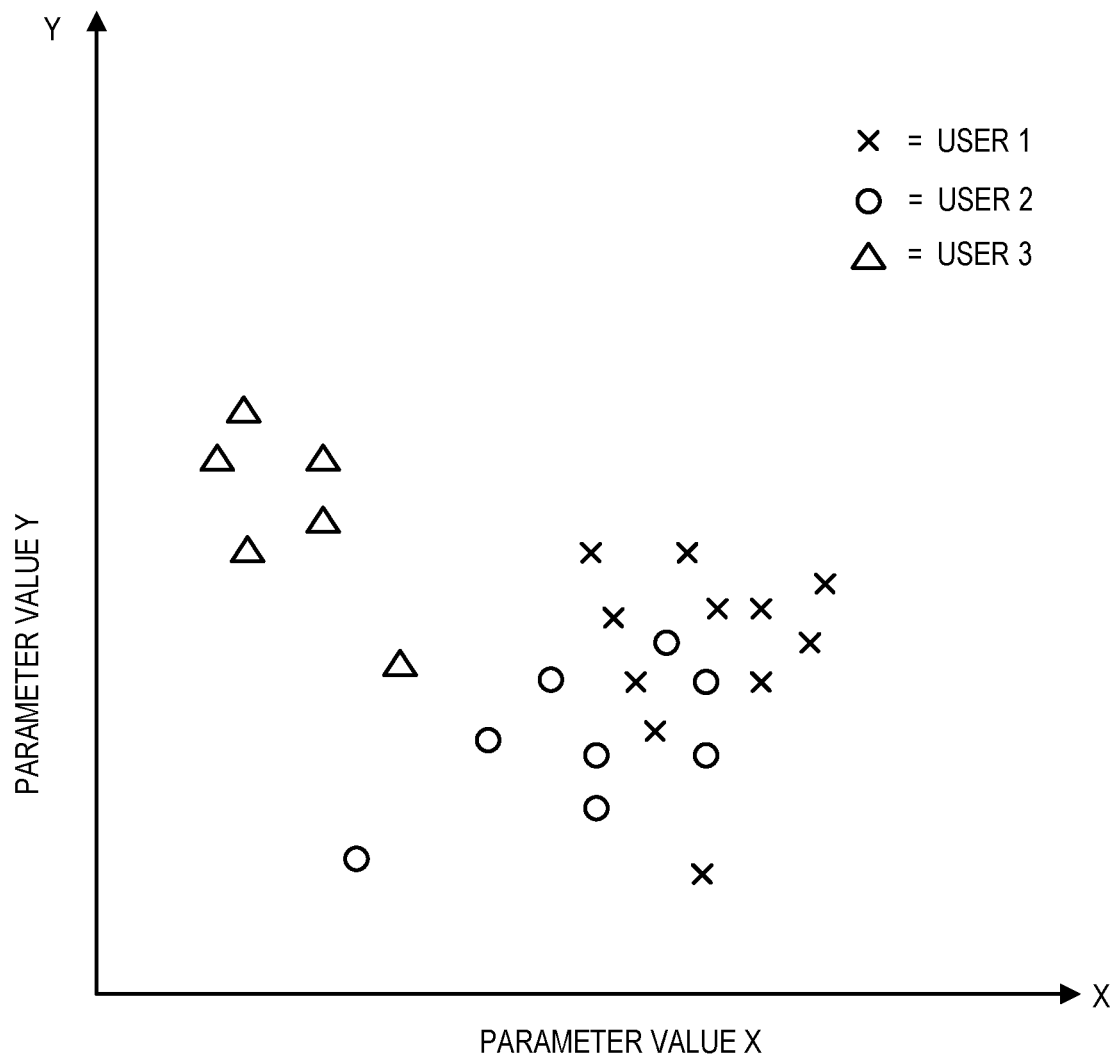
FIG. 7 depicts clustering analysis for comparing messages between multiple users according to one embodiment.

In FIG. 7, the X data points are data points of historical messages of a first user plotted for first and second parameters, the circle data points are datapoints of historical messages of a second user plotted for the first and second parameters, and the triangle data points are data points of historical messages of a first user. It is seen that K means clustering analysis will return a smaller total Euclidian distance score as between the first and second user, than as between the first and third user, indicating that the first and second user are more similar based on the K means analysis than the first and third users.

Manager system 110 can apply higher than baseline scoring under factor F2 in the case that a K-means clustering Euclidean distance value returned on K-means analysis is less than a threshold indicating strong similarity and can apply less than a baseline scoring value under factor F2 in the case that an aggregate Euclidean distance value returned by the K-means clustering analysis is greater than a threshold indicating strong dissimilarity. Factor F2 comprehends that opinions of users historically more similar to the current user should be weighed more heavily than opinions of other users.

Manager system 110, according to factor F3, can assign scoring values under F3 in dependence on the popularity of a defined response message. The popularity of a defined utterance historical response message can be provided based on the count of instances of other candidate messages identified at block 1106 in which a matching response matching a response of the candidate response is specified. For example, more than one candidate message can have the common response of, e.g., "go to Sombrero Mexican restaurant", "go to Joe's Barbershop", and the like. A determination that messages match can be based on the messages specifying common species entities. Manager system 110 can apply scoring values under factor F3 for a certain candidate response message in dependence on the popularity of the message with responses that have higher counts amongst the candidate messages being evaluated being assigned higher scores that response messages having lower counts amongst the candidate messages being evaluated being assigned lower scoring values.

Manager system 110, according to factor F4, can assign scoring values under factor F4 in dependence on a level of expertise associated to the candidate response conversation data message being evaluated.

Embodiments herein recognize that responses from determined experts can be weighed more heavily than opinions of nonexperts in a subject area. Manager system 110 can use natural language processing to ascertain an expertise level associated to a candidate message being evaluated. Manager system 110 at send block 1103 can subject a corpus of messages stored in conversation data area 2122 to natural language processing to extract, e.g., part of speech natural language processing tags, sentiment natural language processing tags, and topic tags. Manager system 110 can also subject corpus messages to natural language processing to extract part of speech tags, i.e., nouns mapping to entities and verbs mapping to intents. Manager system 110 at block 1103 can also subject corpus messages to natural language processing to extract natural language processing tags in the form of word complexity tags. Embodiments herein recognize that word complexity can be used as a measure of expertise in a given area associated to the message with higher scoring values for complexity mapping to higher levels of expertise. Manager system 110 applying factor F4 can assign higher scoring values under factor F4 in dependence on a word complexity parameter value returned for the historical candidate response being evaluated. In one embodiment, all historical messages of each user can be subject to word complexity natural language processing analysis to derive an expertise rating for the particular user. In another example, the historical messages being evaluated can include a reduced set of messages. For example, if the topic domain of the incoming utterance request data defined by the utterance request data message sent at block 1203 relates to a certain topic domain, the historical messages subject to word complexity natural language processing analysis of conversation data area 2122 can be limited to those messages to the certain topic domain, e.g., restaurants, personal services, professional services, and the like. Thus, as part of performing scoring under factor F4, manager system 110 can ascertain a topic domain of an incoming message and filter the messages of the user associated to a candidate message being evaluated subject to word complexity analysis to those messages matching the topic domain.

Manager system 110 applying factor F5 can assign scoring values under factor F5 in dependence on the sentiment associated to a candidate utterance response message being evaluated. Manager system 110 under factor F5 can apply higher than baseline scoring values under factor F5 in the case that the message being evaluated has ae higher than neutral associated sentiment value and can assign lower than baseline scoring values under factor F5 in the case that the candidate response utterance message being evaluated has a sentiment parameter value lower than a neutral sentiment. Factor F5 contemplates that responses of other users exhibiting a more positive sentiment may be more likely to correspond with the true preferences of a current user (the sender of the message at block 1203) than messages exhibiting negative sentiment. In some embodiments, Eq. 1 can be configured so that a candidate response utterance message is filtered out and removed from consideration in the case that a sentiment associated to the message features a sentiment parameter value less than a threshold lower than a threshold negative sentiment parameter value.

Manager system 110 applying factor F6 can assign scoring values under factor F6 in dependence on a determined relevance of the candidate message. Embodiments herein recognize that some candidate messages extracted as candidate messages may, in actuality have a low degree of relevance. For example, the candidate response message can have characteristics of a message that is not responsive the current user's request data. For scoring the candidate response messages, manager system 110 can compare the candidate messages to a response message produced by a social network neutral response assistant that produces responses independent of social relationship data of the current user. Such a social network neutral response assistant can be provided by a commercial off the shelf (COTS) response assistant. In one example, the one or more COTS response assistant can be or have characteristics of a commercially available digital assistant, e.g., ALEXA® personal assistant (ALEXA® is a Registered Trademark of Amazon-.com, Inc. of Seattle, WA), HOMEPOD® intelligent personal assistant available from Apple, Inc. (HOMEPOD® is a Registered Trademark of Apple, Inc. of Cupertino, CA), or Apple iPhone® having SIRI® voice services (iPhone® and SIRI® are Registered Trademarks of Apple, Inc. of Cupertino, CA).

Manager system 110 for scoring under factor F6 can apply the user's input utterance request data message to the social network neutral response assistant to obtain a social network neutral response and then apply both the social network neutral response and candidate message to word to vector predictive model 6002 to obtain a Euclidian distance similarity score between the social network neutral response message and the candidate message. Manager system 110 under factor F6 can apply scoring values under factor F6 inversely proportional to the Euclidian scoring distance so that a candidate message more similar to the social network neutral message is scored more highly than a candidate message having a relatively larger Euclidian distance from the social network neutral message. Multiple social network neutral search engines, e.g., COTs engines can be queried with the results aggregated.

At scoring block 1107, manager system 110 can provide a ranked scoring of all candidate response message utterances in ranked order according to their scoring returned by application of Eq. 1.

On completion of scoring at block 1107, manager system 110 can proceed to block 1108. At block 1108, manager system 110 can return an action decision based on the scoring completed at block 1107. According to one embodiment, manager system 110 at action decision block 1108 can return the action decision to select the highest scoring and highest ranking candidate response utterance message identified by the scoring at block 1107. In selecting the identified highest scoring historical utterance candidate message, manager system 110 can normalize the message so that an intent and an entity extracted from the message are expressed for return of a response to a user without arbitrary filler words contained in the original raw message subject to processing.

The ranked ordered list of other user candidate messages for selection generated at block 1107 can be used in other ways to present response message data to a user in a manner that dependent on a user's social network. In another embodiment, the original input utterance request data message of a user can be applied to a plurality of social network neutral response assistants as explained by with reference to process 119 in order to generate a plurality of response assistant generated candidate response messages. Manager system 110 can then apply the highest ranking "other user" generated candidate response to word to vector predictive model 6002 with each of the candidate response messages generated by the different social network neutral response assistants, in order to generate similarity scoring data scoring a dissimilarity of each response assistant generated response message to the highest ranking other user response message. Manager system 110 can then select the response assistant generated candidate response message having the smallest Euclidian distance to the highest ranking other user candidate response message as the selected response message for presentment to the user. Accordingly, an alternative method by which all of the factors F1-F6 applied for scoring according to Eq. 1 are used for selecting response message data for presentment to a user can be provided.

At various processing stages herein, manager system 110 can apply part of speech tagging for presentment of a response message to a user. In one embodiment, manager system 110 can use adjective part of speech tagging for presentment of a response message to a user. Manager system 110 can apply part of speech tags, including adjective tags to the incoming user utterance request data message sent at block 1203. Then, manager system 110 can ascertain whether the message includes any vague adjectives as determined using a vague adjective decision data structure list, as shown in Table A.

TABLE A

| Row | Vague adjective |
|-----|-----------------|
| 1 | awesome |
| 2 | good |
| 3 | beautiful |
| 4 | big |
| 5 | bad |
| ... | ... |

Embodiments herein recognize that socially connected users can use terms similarly that that conversation data of users socially connected to a current user can inform the meaning of a vague term to the current user. For transformation of a vague term used by the current user to a precise term, manager system 110 can examine conversation message data of socially connected users socially connected to the current user. On identification of a vague term within an incoming utterance request data message, manager system 110 can identify users having a specified order of connection to the current user, e.g., first order, Nth order. Manager system 110 can then further filter messages for examination, e.g., with use of word to vector predictive model 6002 in order to identify messages having a threshold level of similarity to the current incoming utterance request data message. Manager system 110 can input the incoming utterance request data message to word to vector predictive model 6002 with each message of a set of historical messages from conversation data area 2122 in order to derive a similarity score for each historical message with respect to the incoming utterance request data message sent by the current user at block 1203. Manager system 110 can further filter messages by topic domain, to select only messages of the topic domain matching the topic of the incoming utterance request data message. Once a set of candidate historical messages is selected for evaluation, manager system 110 can search for historical messages matching the intent and entity of the current incoming utterance request data message but which include a precise adjective rather than the tagged vague adjective set forth herein. Upon N % of the messages having a common intent and entity being identified as including the same precise adjective, manager system 110 can return the action decision to transform the incoming utterance request data message by replacing the tagged vague adjective with the precise adjective. Manager system 110 can determine that an adjective is precise by discerning that the adjective is absent from the vague adjective list of Table A. Examples of precise adjectives can include, e.g., "green", "farther", "larger".

With the initial incoming utterance request data message transformed, manager system 110 can present the transformed utterance request data message to one or more social relationship neutral response assistants described with reference to social network neutral response process 119 (FIG. 1) for return of a selected response message.

At send block 1109, manager system 110 can send the selected response message defined by an intent and an entity for receipt by the UE device sending utterance request data at block 1203, i.e., UE device 120A in the described example.

In response to the received response message data, UE device 120A at output block 1204 can output the provided response message, e.g., to a display such as display area 3006 of user interface 3000 (FIG. 3) and/or an audio output device of the current user's UE device.

On completion of send block 1109, manager system 110 can proceed to return block 1110. At return block 1110, manager system 110 can return to a stage proceeding NLP block 1105 so that manager system 110 receives a next iteration of user-defined utterance request data from a UE devices of UE devices 120A-120Z. Manager system 110 can iteratively perform the loop of blocks 1105-1110. It will be understood that manager system 110 can be contemporaneously performing the loop of blocks 1105-1110 in order to simultaneously serve multiple ones of UE devices of UE devices 120A-120 Z simultaneously and contemporaneously.

Embodiments herein recognize when making a request to a digital assistant, e.g., for booking appointments, a user is required to actively determine the factors he or she needs to make the best decision as to where to book the appointment. If the user desires to book an appointment at an optimal place, the user is required to perform significant research to determine what is the best location. The user may verbally ask friends, research reviews online, arbitrarily choose a location, etc. Then the user must book the appointment, unknowing how satisfied they will be with the service provided. Ultimately, conversationally a user may interact with the VA using generic terms but not want to answer follow-up queries.

Embodiments herein provide a method by which system 100 can identify the user's social network in order to respond to a user request, e.g., to book an appropriate appointment for a service which has partial intent or context given by the user. Embodiments herein provide a weighted referential response service which can include an appointment booking service for which the user can then automatically be booked for an appointment following his/her preferences.

According to one example, a user may wish to make an appointment for a haircut and tells the system to book an appointment for a haircut at a preferred place using generic terms. The system then queries the user's network of friends to determine which locations friends have used (based on location) and can determine their sentiment towards the locations discussed or visited. The system can then determines the best location, according to the analysis of friends' network activity and books the appointment for the user. In this scenario, the user does not need to research locations on their own, and the user can be confident that the selected choice is pleasing. Further description is provided with reference to the below examples.

Example 1

Shikhar says: "Digital assistant, book an appointment for haircut someplace nice." Invention workflow: Social network friends are identified as those living closer and Jenny/Zach prefer to go to a common place and have a good experience based on IoT sensor rating. The system crawls into my friend network to gather that information and without the need to provide specifics on the place, it automatically calls the one which Jenny/Zach recommended online on a social media portal comments extraction, rating or text messages, etc. In addition, if no satisfactory location is established by the friend network, sentiment towards establishments can be assessed to avoid locations that Jenny or Zach dislike.

End of Example 1

Example 2

Zach says: "Digital assistant, book an appointment somewhere nearby". The system processes the user's social media connections and derives that when other friends/connections search "Somewhere nearby" that is within 10 minute drive. The system takes into account patterned driving conditions for time of day and books an appointment for Zach that will keep him within the 10 minute drive window (or the "somewhere nearby" assessed timeframe).

End of Example 2

Example 3

Bob says: "Digital assistant, book an appointment somewhere nearby" The system processes user's social media connections and derives that when other friends/connections search "Somewhere nearby" that is within 7 minute walk. The system determines best path information, taking into consideration safety precautions and crime statistics, and provides an appointment request for Bob within the defined time measurement assessed.

End of Example 3

Example 4

The user can tell the system to book an appointment (haircut) for the same location a specific friend used. The system can then analyze the information shared by the friend (location, discussion of haircut, geographical check in) and can book the appointment for the user. If data is unavailable, the system can query the friend for the information, on behalf of the user, to determine the location information.

End of Example 4

Figure 8:
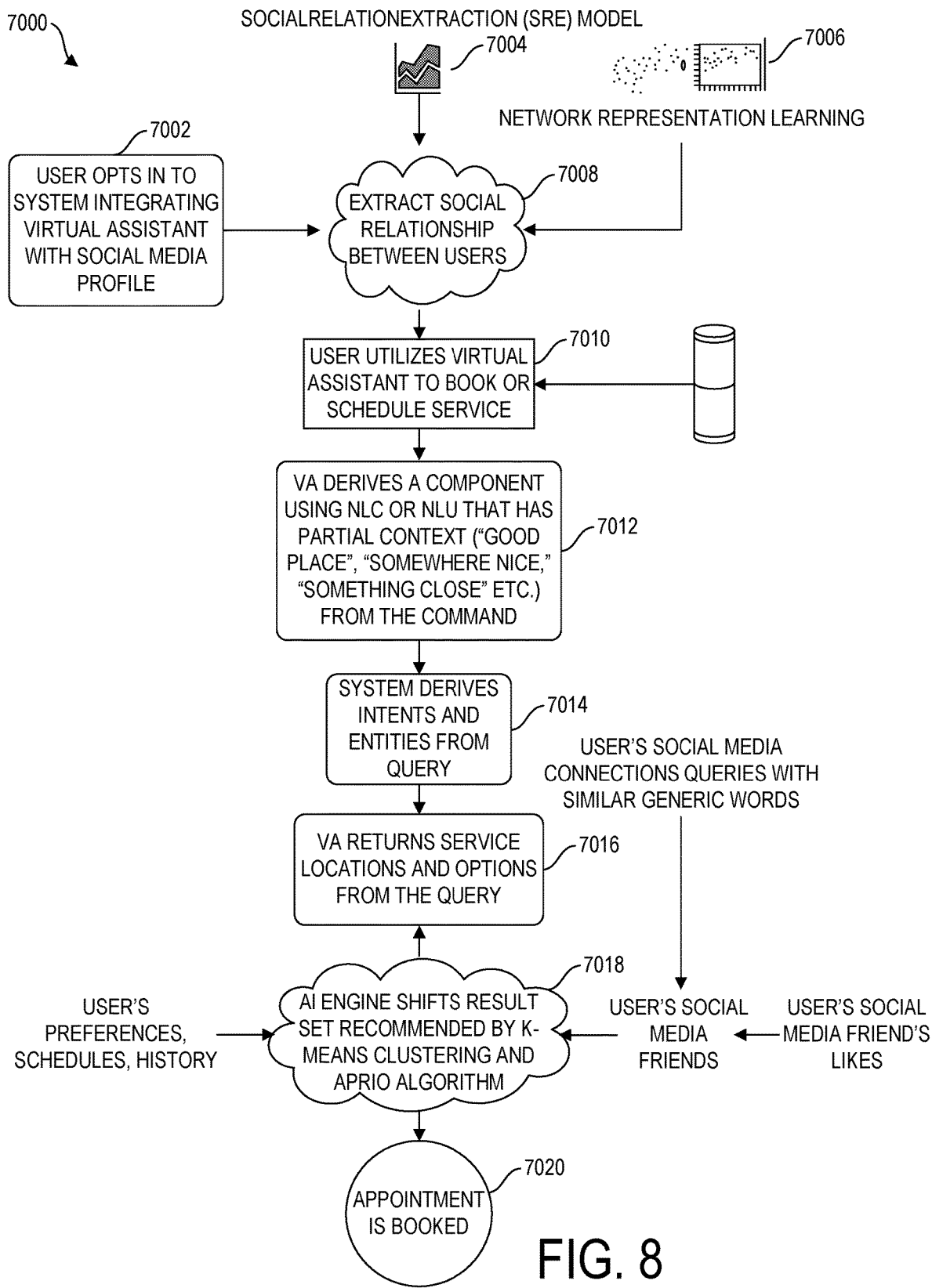
FIG. 8 is a flowchart depicting social relation extraction according to one embodiment.

Referring to FIG. 8 the user's social network can be established, e.g., based on social media accounts, messaging applications, phone interaction, calendar entries, geolocation opt-in (can vary based on information to be shared by the user as permissions). There can be provided network representation learning. Network representation learning can include, e.g., a social relation extraction (SRE) model to predict social relations for social networks. A translation based network can be used to incorporate multiple relational labels on edges into NRL (Network Representation Learning). A translation based network can be capable of predicting multiple labels on the edges in EU (shown below).

Example 5

A user can ask the system to book an appointment based on a description of the needed activity. The system can assess friend activity and sentiment towards items within the user's desired category using a translation based network with K-means clustering.

End of Example 5

Example 6

A user can ask the system to book a "good" Italian restaurant for dinner. The system can assess the user's social network for posts regarding Italian restaurants, determines "check-ins" at restaurants in this category, determines sentiment of attitude towards the restaurants it discovers (based on friend interaction), and determines the Italian restaurant with the highest satisfaction among the user's social interactions.

End of Example 6

Embodiments herein can include (a) initializing the social networks model using a translation based network to create edge/vertices with connected links and social relations between entities; (b) apply K-Means clustering to create grouping for similar comments/post/query posted users; (c) Using word to vector (Word2Vec) for similarity in the context based on user's content, check the same topic and similarities in the content queried by the various social network users in the past; (d) Creating the clusters for similarity index or same post posted users in network; (e) Using an edge relationship (E_R) to determine the strength from a translation based network in order to generate clustered recommendations; (f) Giving K-means as an input to an Aprio Algorithm. The Aprio algorithm can apply on clusters of same post; (g) checking and comparing the similarities using Aprio algorithm. (e.g., Profile, movies, mutual friends, books etc.); (h) Check and calculating user's similarity index and assign highest number to highest similarity users using ranking algorithm; (i) Arranging the similarity users in descending order using reinforced weights from Transnet Model based on strength of said relationships and normalized output. In the manner described the system determines the best chance of success by learning which friends have the most in common with the user.

Example 7

A user tends to have a higher rated satisfaction rate towards the choices Friend A makes over Friend B. When the option to book a requested appointment, Friend A's choice will be rated as more desirable than Friend B's choice. The system consults with the user's schedule and calendar entries, route schedule, etc. and determines the best time for the requested appointment The system books the appointment for the user, seamlessly, and can optionally add the appointment directly into the user's calendar and schedule application.

End of Example 7

Method 7000 depicted in the flowchart of FIG. 8 illustrates aspects of a social relation extraction (SRE) model in one embodiment. A user can opt into the system at block 7002. At block 7008 social relationships between users can be extracted using various resources 7004 and 7006. At block 7010 a user can use an assistant to book a service. At block 7012 the assistant can derive a component that includes a partial context. At bock 7014 the system can derive intents and entities. At block 7016 the assistant can return service locations and options. At block 7018 the system can shift results using K-means clustering. At block 7020 an appointment can be booked.

Certain embodiments herein may offer various technical computing advantages, involving computing advantages to address problems arising in the realm of computer systems. Embodiments herein can examine social network data of a certain user to provide response data to a user. Embodiments herein can subject vocal utterance request data to natural language processing to derive multiple NLP tags in the form, e.g., of part of speech tags, topic tags, sentiment tags, intent tags, entity tags, and the like. Embodiments herein can utilize word to vector analysis natural language processing for comparison of message data of multiple messages. Embodiments herein can include identifying other user candidate responses to user input utterance request data and application of a multi-factor formula for evaluation of the candidate response. A variety of methods can be employed for filtering the candidate response messages including use of topic domains. Evaluating candidate responsive messages can include, e.g., K-means clustering analysis, sentiment analysis, word complexity analysis and relevancy analysis using a social relationship neutral response assistant. A result of analysis of candidate other user response can be used to provide response data to a user in multiple ways. For example, intent and/or entity of a ranked other user candidate response can be extracted for production of response message data, or a ranked other user candidate response can be compared to multiple candidate responses generated using sentiment neutral response assistant for selection of a best candidate response assistant generated response for presentment to a user. A fundamental aspect of a computer system's functionality is its ability to interact with users. If users are given irrelevant or inaccurate information, users are likely to disengage from a computer system. If one the other hand a computer system provides accurate and relevant information the attention of a user can be retained as well as continued interactions between computer system users. Embodiments herein can improve networked communications between users in one aspect with use of features that use artificial intelligence to provide recommendations and notifications to users based on the recommendations. The recommendations and notices in an illustrative embodiment can relate to recommendation on help assistance to provide help assistance in respect to a specified task. With accurate information provided a likelihood of respective users of networked computer systems remaining engaged an in communication with another through the performance of a task and over the course of the performance of several tasks increases. Embodiments herein can employ data structuring processes, e.g., employing relationship graphs for structuring data to transform unstructured data optimized for human processing into a form optimized for computerized processing. Embodiments herein can provide results and advantages that are not possible or practical without use of components of a technical computing environment, such as providing for decision making beyond the limits of human ability to recall events and items related to events and beyond the human user's capacity to recognize patterns and recognize significance of events. Embodiments herein can for example feature crowdsourced rules so that determinations provided by a computer system accurately account for varying perspectives of a plurality of users. Embodiments herein can include artificial intelligence processing platforms featuring improved processes to transform unstructured data into structured form permitting computer based analytics and predictive decision making. In one embodiment, a relationship graph template can be provided which keys both collection of structured data and the providing of one or more output. Embodiments herein also can include machine learning platforms that leverage historical data for improved predictive analytics. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 9:
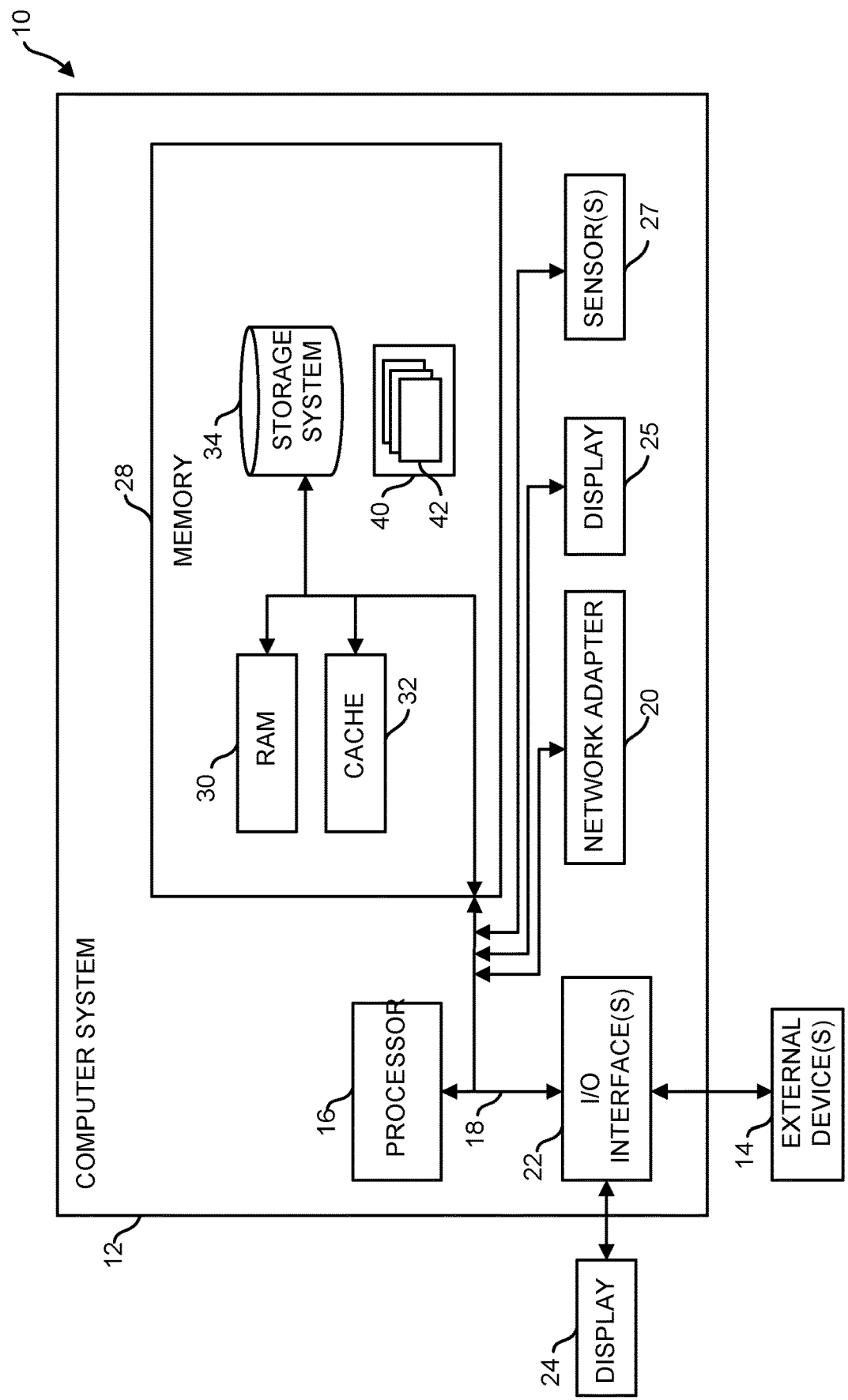
FIG. 9 depicts a computing node according to one embodiment.
Figure 10:
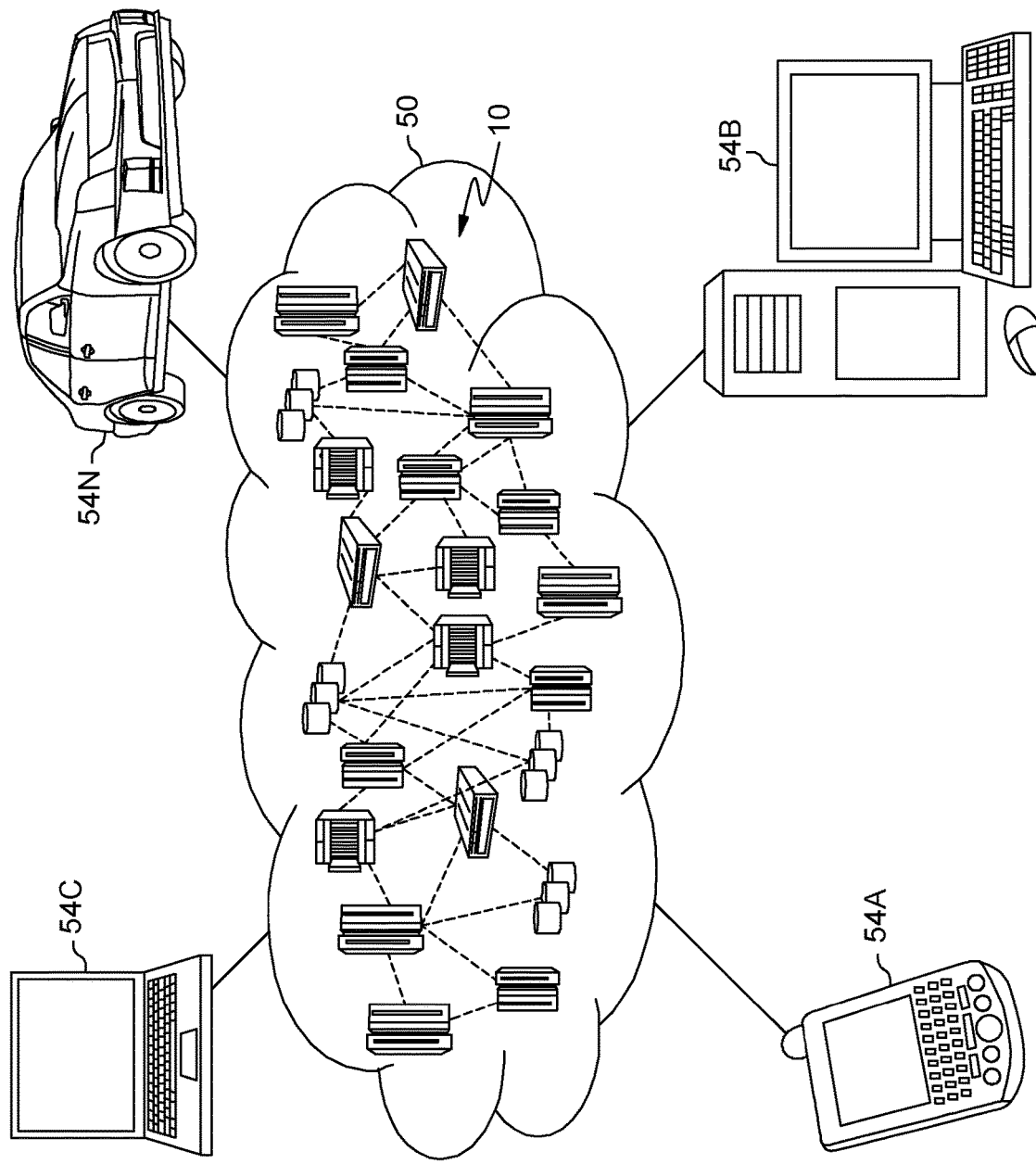
FIG. 10 depicts a cloud computing environment according to one embodiment.
Figure 11:
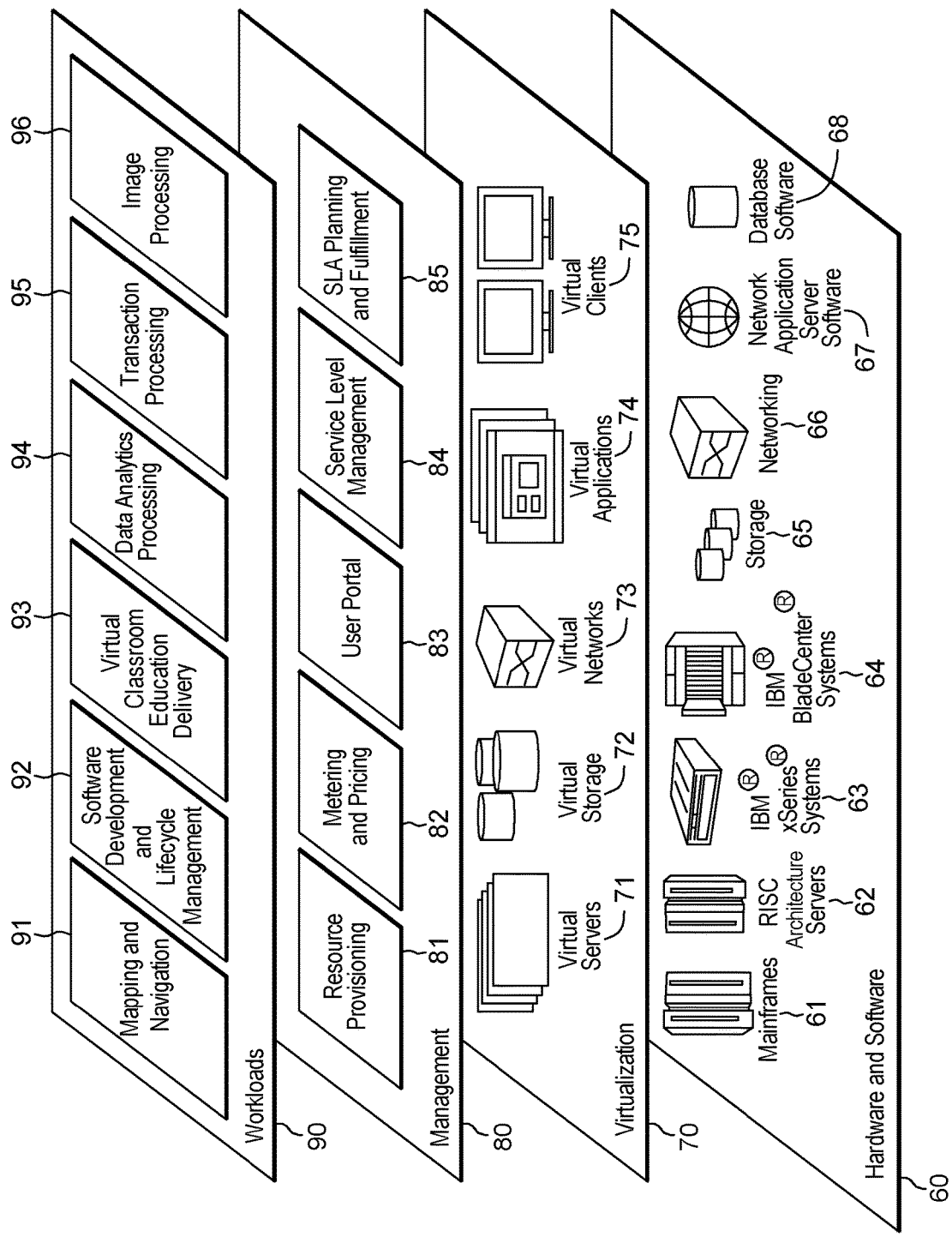
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 2 and the flowchart of FIG. 8. In one embodiment, one or more UE devices 120A-120Z can include one or more computing node 10 and can include one or more program 40 for performing functions described with reference to one or more UE devices 120A-120Z as set forth in the flowchart of FIG. 2. In one embodiment, one or more social media system 140 can include one or more computing node 10 and can include one or more program 40 for performing functions described with reference to one or more social media system 140 as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for providing response data as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   examining social network data of a user, wherein the social network data specifies social network connections of the user;
   obtaining from the user voice data defining a vocal utterance request of the user;
   converting the voice data defining the vocal utterance request of the user into a text based message;
   subjecting the text based message to natural language processing;
   analyzing historical messages of the social network of the user to determine whether any historical messages of the social network connections of the user provide insight into the vocal utterance request of the user;
   determining a response message to the vocal utterance request of the user, wherein the determining the response data to the vocal utterance request of the user is based at least in part on a score assigned to the analyzed historical messages of the social network of the user, wherein the score is determined based on a combination of a plurality of weighted factors comprising a social relationship factor, a message similarity factor, a popularity factor, an expertness factor, a relevance factor, and a sentiment factor; and
   presenting the response message to the user.

2. The computer implemented method of claim 1, wherein the method includes subjecting the text based message to natural language processing and wherein the determining the response data to the vocal utterance request is performed in dependence on the examining of the social network data of the user, and in dependence on a result of the natural language processing.

3. The computer implemented method of claim 1, wherein the response message is determined in dependence on an analysis of the historical messages of the user with reference to historical messages of a second user of the social network of the user, the second user being referenced in the social network data of the user, wherein the analysis includes determining a similarity between the historical messages of the user to the historical messages of the second user.

4. The computer implemented method of claim 1, wherein the response message is determined in dependence on an analysis of the historical messages of the user with reference to historical messages of a second user of the social network of the user, the second user being referenced in the social network data of the user, wherein the analysis includes employing K-means analysis to determine a similarity between the historical messages of the user to the historical messages of the second user.

5. The computer implemented method of claim 1, wherein the method includes subjecting the text based message to extract a topic domain of the voice data defining the vocal utterance request of the user, wherein the method includes selecting first historical messages of the user and selecting second historical messages of a second user of the social network of the user in dependence on the topic domain extracted from the text based message, wherein the response message is determined in dependence on an analysis of the first historical messages of the user with reference to second historical messages of the second user of the social network of the user, the second user being referenced in the social network data of the user, wherein the analysis includes employing K-means analysis to determine a similarity between the first historical messages of the user to the second historical messages of the second user.

6. The computer implemented method of claim 1, wherein the method includes subjecting the text based message to extract a topic domain of the voice data defining the vocal utterance request of the user, wherein the method includes selecting historical messages of a second user of the social network of the user in dependence on the topic domain extracted from the text based message, and wherein the response message is determined in dependence on a result of subjecting the historical messages of the second user to natural language processing, the natural language processing of the historical messages of the second user including word complexity analysis of the historical messages of the second user.

7. The computer implemented method of claim 1, wherein the method includes subjecting the text based message to natural language processing, the natural language processing including part of speech tagging to tag an adjective of the text based message, wherein the method includes transforming the text based message by replacing a first adjective tagged in the text based message with a second replacement adjective, the second replacement adjective determined with use of analyses of historical message data of a second user, the second user referenced in the social network data of the user.

8. The computer implemented method of claim 1, wherein the method includes subjecting the text based message to processing for identifying a vague word of text based message with use of a vague word list, wherein the method includes transforming the text based message by replacing the vague word in the text based message with a replacement word, the replacement word determined with use of analyses of historical message data of a second user, the second user referenced in the social network data.

9. The computer implemented method of claim 1, wherein the method includes subjecting the text based message to natural language processing to extract a topic domain of the voice data defining the vocal utterance request of the user, wherein the method includes selecting historical messages of a plurality of other users in dependence on the topic domain extracted from the text based message, wherein the plurality of other users are referenced in the social network data of the user, wherein the response message is determined in dependence on a result of subjecting the historical messages of plurality of other users to processing by natural language processing.

10. The computer implemented method of claim 1, wherein the method includes subjecting the text based message to natural language processing to extract a topic domain of the voice data defining the vocal utterance request of the user, wherein the method includes selecting historical messages of a plurality of other users in dependence on the topic domain extracted from the text based message, wherein the plurality of other users are referenced in the social network data of the user, wherein the response message is determined in dependence on a result of subjecting the historical messages of plurality of other users to processing by natural language, wherein the processing by natural language processing includes natural language processing to extract sentiment tags associated to the historical messages of a plurality of other users.

11. The computer implemented method of claim 1, wherein the method includes subjecting the text based message to natural language processing, wherein the determining the response data to the vocal utterance request is performed in dependence on the examining of the social network data of the user, and in dependence on a result of the natural language processing, wherein the response message is determined in dependence on an analysis of historical messages of the user with reference to historical messages of a second user, the second user being referenced in the social network data of the user, wherein the analysis includes determining a similarity between the historical messages of the user to the historical messages of the second user.

12. A computer program product comprising:
a computer readable storage medium readable by one or more processing circuit and storing instructions for execution by one or more processor for performing a method comprising:
examining social network data of a user, wherein the social network data specifies social network connections of the user;
obtaining from the user voice data defining a vocal utterance request of the user;
converting the voice data defining the vocal utterance request of the user into a text based message;
subjecting the text based message to natural language processing;
analyzing historical messages of the social network of the user to determine whether any historical messages of the social network connections of the user provide insight into the vocal utterance request of the user;
determining a response message to the vocal utterance request of the user, wherein the determining the response data to the vocal utterance request of the user is based at least in part on a score assigned to the analyzed historical messages of the social network of the user, wherein the score is determined based on a combination of a plurality of weighted factors comprising a social relationship factor, a message similarity factor, a popularity factor, an expertness factor, a relevance factor, and a sentiment factor; and
presenting the response message to the user.

13. The program product of claim 12, wherein the method includes subjecting the text based message to natural language processing, wherein the determining the response data to the vocal utterance request is performed in dependence on the examining of the social network data of the user, and in dependence on a result of the natural language processing.

14. The program product of claim 12, wherein the response message is determined in dependence on an analysis of the historical messages of the user with reference to historical messages of a second user, the second user being referenced in the social network data of the user, wherein the analysis includes determining a similarity between the historical messages of the user to the historical messages of the second user.

15. The program product of claim 12, wherein the response message is determined in dependence on an analysis of the historical messages of the user with reference to historical messages of a second user, the second user being referenced in the social network data of the user, wherein the analysis includes employing K-means analysis to determine a similarity between the historical messages of the user to the historical messages of the second user.

16. The program product of claim 12, wherein the method includes subjecting the text based message to extract a topic domain of the voice data defining the vocal utterance request of the user, wherein the method includes selecting first historical messages of the user and selecting second historical messages of a second user in dependence on the topic domain extracted from the text based message, wherein the response message is determined in dependence on an analysis of the first historical messages of the user with reference to the second historical messages of the second user, the second user being referenced in the social network data of the user, wherein the analysis includes employing K-means analysis to determine a similarity between the first historical messages of the user to the second historical messages of the second user.

17. The program product of claim 12, wherein the method includes subjecting the text based message to extract a topic domain of the voice data defining the vocal utterance request of the user, wherein the method includes selecting historical messages of a second user of the social network of the user in dependence on the topic domain extracted from the text based message, and wherein the response message is determined in dependence on a result of subjecting the historical messages of the second user to natural language processing, the natural language processing of the historical messages of the second user including word complexity analysis of the historical messages of the second user.

18. The program product of claim 12, wherein the method includes subjecting the text based message to natural language processing, the natural language processing including part of speech tagging to tag an adjective of the text based message, wherein the method includes transforming the text based message by replacing a first adjective tagged in the text based message with a second replacement adjective, the second replacement adjective determined with use of analyses of historical message data of a second user, the second user referenced in the social network data of the user.

19. The computer program product of claim 12, wherein the method includes subjecting the text based message to natural language processing, wherein the determining the response data to the vocal utterance request is performed in dependence on the examining of the social network data of the user, and in dependence on a result of the natural language processing, wherein the response message is determined in dependence on an analysis of the historical messages of the user with reference to historical messages of a second user, the second user being referenced in the social network data of the user, wherein the analysis includes determining a similarity between the historical messages of the user to the historical messages of the second user.

20. A system comprising:
a memory;
at least one processor in communication with the memory; and
program instructions executable by one or more processor via the memory to perform a method comprising:
examining social network data of a user, wherein the social network data specifies social network connections of the user;
obtaining from the user voice data defining a vocal utterance request of the user;
converting the voice data defining the vocal utterance request of the user into a text based message;
subjecting the text based message to natural language processing;
analyzing historical messages of the social network of the user to determine whether any historical messages of the social network connections of the user provide insight into the vocal utterance request of the user;
determining a response message to the vocal utterance request of the user, wherein the determining the response data to the vocal utterance request of the user is based at least in part on a score assigned to the analyzed historical messages of the social network of the user, wherein the score is determined based on a combination of a plurality of weighted factors comprising a social relationship factor, a message similarity factor, a popularity factor, an expertness factor, a relevance factor, and a sentiment factor; and
presenting the response message to the user.

* * * * *